US008710401B2

(12) United States Patent
Li (10) Patent No.: US 8,710,401 B2
(45) Date of Patent: Apr. 29, 2014

(54) LASER PROCESSING MACHINE

(76) Inventor: Chun-Hao Li, Taipei (TW)

( * ) Notice: Subject to any disclaimer, the term of this patent is extended or adjusted under 35 U.S.C. 154(b) by 447 days.

(21) Appl. No.: 13/241,644

(22) Filed: Sep. 23, 2011

(65) Prior Publication Data

US 2013/0015166 A1   Jan. 17, 2013

(30) Foreign Application Priority Data

Jul. 13, 2011   (TW) .............................. 100212869 U (51) Int. Cl.
*B23K 26/14* (2014.01)
*B23K 26/12* (2014.01)
*B23K 26/08* (2014.01)

(52) U.S. Cl.
USPC ............ 219/121.68; 219/121.84; 219/121.86; 156/345.51

(58) Field of Classification Search
CPC .......................... B23K 26/127; B23K 26/1405
USPC .......................... 219/121.68, 121.84, 121.86; 156/345.51
See application file for complete search history.

(56) References Cited

U.S. PATENT DOCUMENTS

| 5,736,709 A * | 4/1998 | Neiheisel ................. 219/121.61 |
| 6,926,801 B2 * | 8/2005 | Morishige ................. 156/345.5 |
| 2008/0296263 A1 * | 12/2008 | Alexander et al. ............. 216/94 |
| 2012/0076881 A1 * | 3/2012 | Champonnois et al. ...... 425/174 |

* cited by examiner

*Primary Examiner* — Samuel M Heinrich
(74) *Attorney, Agent, or Firm* — Muncy, Geissler, Olds & Lowe, P.C.

(57) ABSTRACT

A laser processing machine includes a cavity, a laser system, at least one processing platform, and at least one upper motion platform. The laser system is disposed at a lower part inside the cavity, and used for outputting a laser beam. A traveling direction of the laser beam is opposite to the gravity direction. The processing platform is disposed at an upper part inside the cavity, and includes an adsorption surface and a connection surface facing each other. The adsorption surface is located below the connection surface, and is used for adsorbing a workpiece. The upper motion platform is disposed at the upper part inside the cavity, and is correspondingly connected to the connection surface of the processing platform, in order to cause the processing platform to move.

11 Claims, 11 Drawing Sheets

LASER PROCESSING MACHINE

CROSS-REFERENCES TO RELATED APPLICATIONS

This non-provisional application claims priority under 35 U.S.C. §119(a) on Patent Application No. 100212869 filed in Taiwan, R.O.C. on 2011/7/13, the entire contents of which are hereby incorporated by reference.

BACKGROUND

1. Technical Field

The disclosure relates to laser processing, and more particularly to a laser processing machine.

2. Related Art

Laser technology has been widely applied to many fields. For example, in the panel manufacturing field, chemical waste liquid produced in wet processes may easily cause contamination to the environment. If a laser beam is used for panel scribing, the generation of the chemical waste liquid is avoided; furthermore, laser scribing technology enables high precision work. Consequently, in addition to drilling and cutting, laser technology is also applicable to fields requiring wiring or patterning, for example, scribing of a short-circuit ring on a panel, repairing of a thin-film transistor (TFT) circuit, direct-writing of a pattern for a surface printed circuit, graphics making of a sensing conductive thin-film circuit, forming of a precise wiring pattern for a flexible circuit board, and isolation scribing of a solar-power thin-film circuit.

Figure 1:
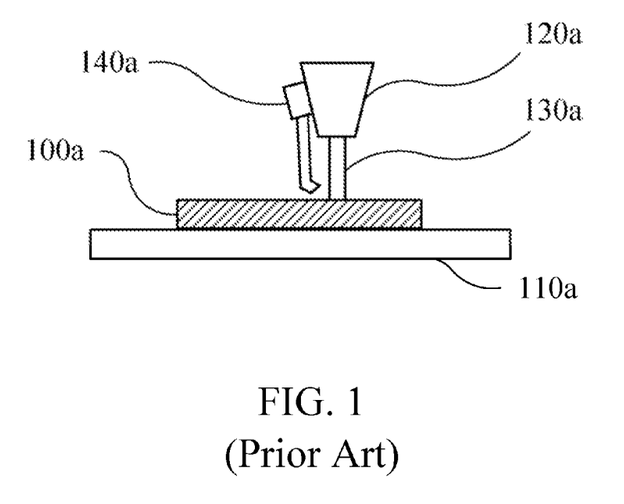
FIG. 1 is a schematic view of laser processing in the prior art.

FIG. 1 is a schematic view of laser processing in the prior art. Please refer to FIG. 1. A workpiece 100a, for example, a panel, is loaded on a processing platform 110a. A laser head 120a is located above the workpiece 100a and downwardly outputs a laser beam 130a, to scribe, drill, or cut the workpiece 100a. However, the workpiece 100a may be gasified when heated, and produce dust on a surface of the workpiece 100a. The dust falling on the workpiece 100a may easily cause short-circuit of the cut wiring. An air-suction device 140a may be disposed on the laser head 120a, and sucks air to cause an airflow, so that the dust falling on the surface of the workpiece 100a is sucked and brought away with the airflow. However, dust particles of larger sizes may easily fall back onto the surface of the workpiece, or may be adsorbed onto the workpiece 100a due to static electricity generated on the surface of the workpiece 100a.

Furthermore, after the laser processing, it is required to check whether the processing result is desirable, and if any error, laser repair is needed. Therefore, after being processed on the laser processing machine, the workpiece 100a needs to be transferred to a detection machine for electrical measurement or visual observation, so as to find undesirable parts after processing. Next, the workpiece 100a is transferred to the laser processing machine (or a laser repair machine), for repair. In this manner, whenever the workpiece 100a is placed on a different machine, the workpiece 100a needs to be located once, wasting processing time.

SUMMARY

To solve the problems in the prior art, the disclosure is directed to a laser processing machine.

In an embodiment, the disclosure provides a laser processing machine, which includes a cavity, a laser system, at least one processing platform, and at least one upper motion platform.

The laser system is disposed at a lower part inside the cavity, and used for outputting a laser beam. A traveling direction of the laser beam is opposite to the gravity direction. The processing platform is disposed at an upper part inside the cavity, and includes an adsorption surface and a connection surface facing each other. The adsorption surface is located below the connection surface, and is used for adsorbing a workpiece. The upper motion platform is disposed at the upper part inside the cavity, and is correspondingly connected to the connection surface of the processing platform, in order to cause the processing platform to move.

Through the disclosure, dust is effectively removed by gravity, so as to avoid wiring failure, and improve the industrial production yield. When a plurality of processing platforms and a plurality of upper motion platforms is provided, processing and detection can be performed at the same time, increasing the industrial production capacity.

BRIEF DESCRIPTION OF THE DRAWINGS

The disclosure will become more fully understood from the detailed description given herein below for illustration only and thus not limitative of the disclosure, wherein.

DETAILED DESCRIPTION

Figure 2:
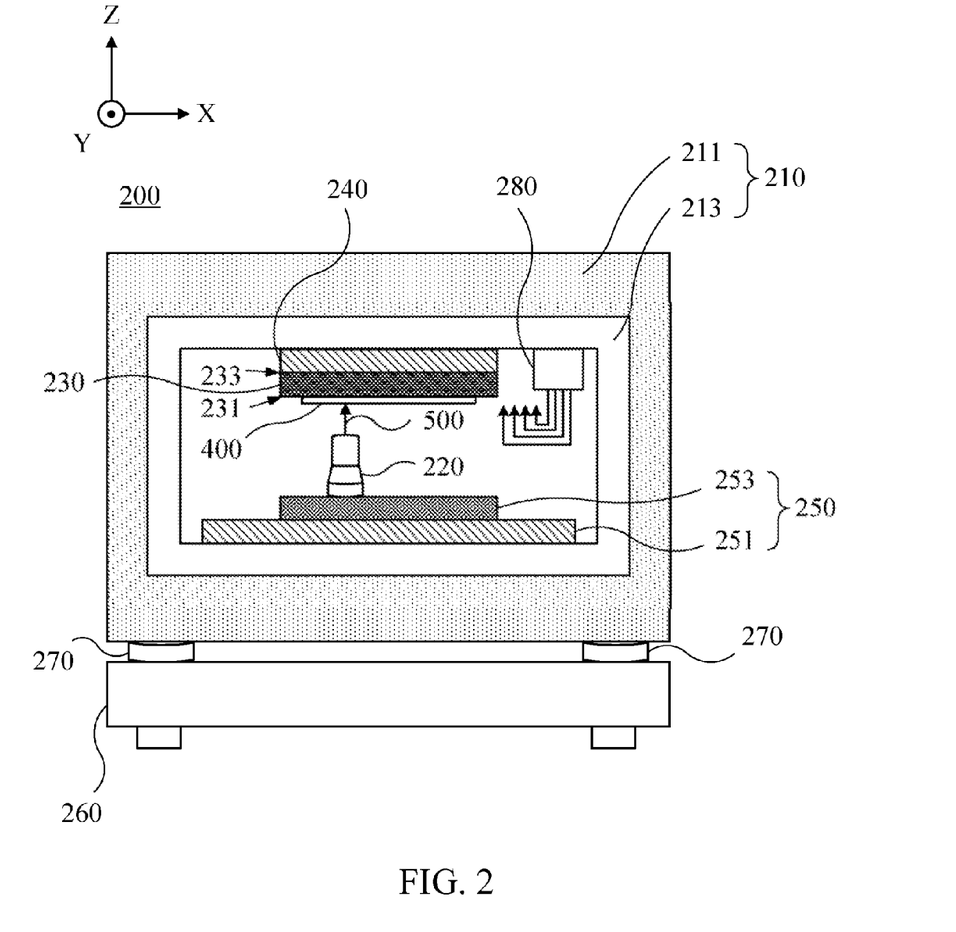
FIG. 2 is a schematic back view of a laser processing machine according to a first embodiment.

FIG. 2 is a schematic back view of a laser processing machine 200 according to a first embodiment. As shown in FIG. 2, the laser processing machine 200 includes a cavity 210, a laser system 220, a processing platform 230, and an upper motion platform 240. The laser system 220 is disposed at a lower part inside the cavity 210. The processing platform 230 and the upper motion platform 240 are disposed at an upper part inside the cavity 210.

The laser system 220 is used for outputting a laser beam 500 having a traveling direction opposite to the gravity direction. The processing platform 230 has an adsorption surface 231 and a connection surface 233 facing each other, and the adsorption surface 231 is located below the connection surface 233. The adsorption surface 231 is used for adsorbing a workpiece 400. The upper motion platform 240 is connected to the connection surface 233 of the processing platform 230, and used for driving the processing platform 230 to move.

In some embodiments, the upper motion platform 240 includes an X-axis motion platform and a Y-axis motion platform (not shown), which are used for driving the processing platform 230 to move along an X-axis direction and a Y-axis direction, so that a particular pattern is scribed on the workpiece 400.

Consequently, dust produced by the workpiece 400 when heated by the laser beam or due to photo-chemical reaction may fall off under the influence of gravity. In addition, the movement of the upper motion platform 240 also helps to shake off the dust on the workpiece 400.

As shown in FIG. 2, the laser processing machine 200 further includes a first lower motion platform 250, a seat 260, a damping system 270, an electrical measurement system 280, and a material delivery system 290.

The first lower motion platform 250 is disposed at the lower part inside the cavity 210, and used for loading and driving the laser system 220 to move. In some embodiments, the first lower motion platform 250 includes an X-axis motion platform 251 and a Z-axis motion platform 253. The X-axis motion platform 251 enables the laser system 220 to move along the X-axis direction. The Z-axis motion platform 253 enables the laser system 220 to move along the Z-axis direction. In this manner, the laser system 220 is enabled to move to an appropriate position corresponding to a portion to be processed on the workpiece 400.

The damping system 270 is disposed between the cavity 210 and the seat 260, for restricting external vibration on the system inside the cavity 210, to prevent the external vibration from affecting the precision of the processing. In some embodiments, the damping system 270 includes a plurality of dampers.

In some embodiments, the material delivery system 290 is disposed between the processing platform 230 and the first lower motion platform 250, and used for loading the workpiece 400 (placing the workpiece 400 on the processing platform 230), and unloading the workpiece 400 (removing the workpiece 400 from the processing platform 230). For ease of illustration, the detailed description of the material delivery system 290 will be given hereinafter with reference to FIG. 4.

The electrical measurement system 280 may measure resistance of a wire on the workpiece 400 after processing by using a gated-four-probe method, or perform fast switch switching to achieve data discrimination of open-circuit or short-circuit by using a manufacture tool of a whole surface soft pressure probe station. In this manner, it is determined according to the open-circuit and short-circuits situations of the wire whether the workpiece 400 needs to be repaired.

The electrical measurement system 280 may be disposed at the upper or lower part inside the cavity 210, and may work together with the material delivery system 290, so that the probe station of the electrical measurement system 280 is combined with the material delivery system 290. For example, the material delivery system 290 places the workpiece 400 on the processing platform 230 in a locating manner (for example, by using a locating pin or using a mechanical manipulator with visual location). Meanwhile, the electrical measurement system 280 also achieves a location effect through the material delivery system 290, to facilitate quality control before or after processing.

In some embodiments, the electrical measurement system 280 includes a lifting platform, so as to be smoothly lifted to the processing platform 230.

Figure 3A:
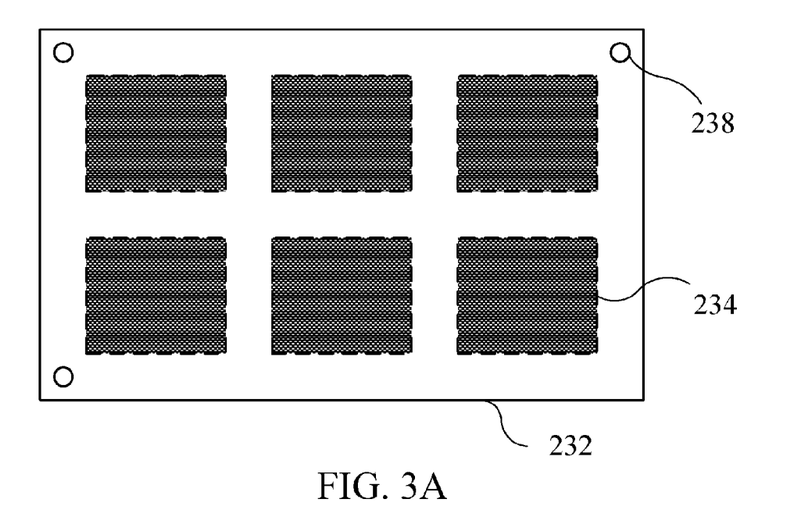
FIG. 3A is a schematic bottom view of a processing platform according to the first embodiment.
Figure 3B:
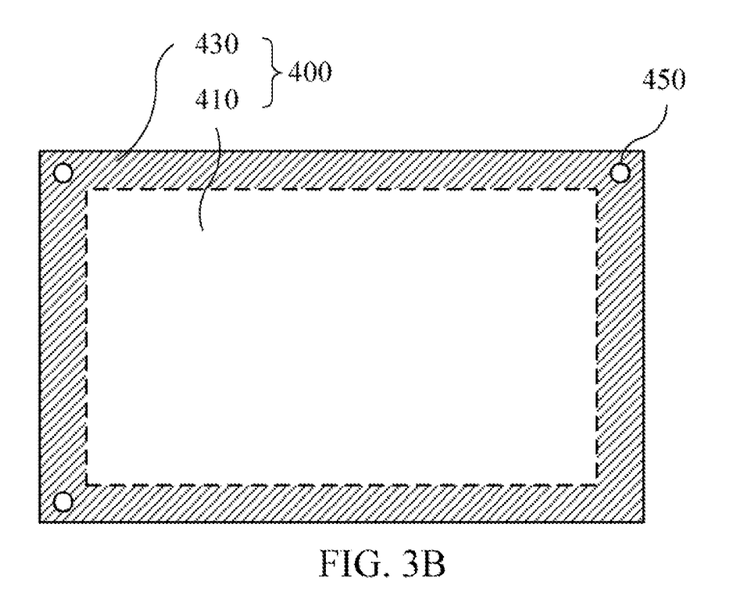
FIG. 3B is a schematic bottom view of a workpiece according to the first embodiment.
Figure 4:
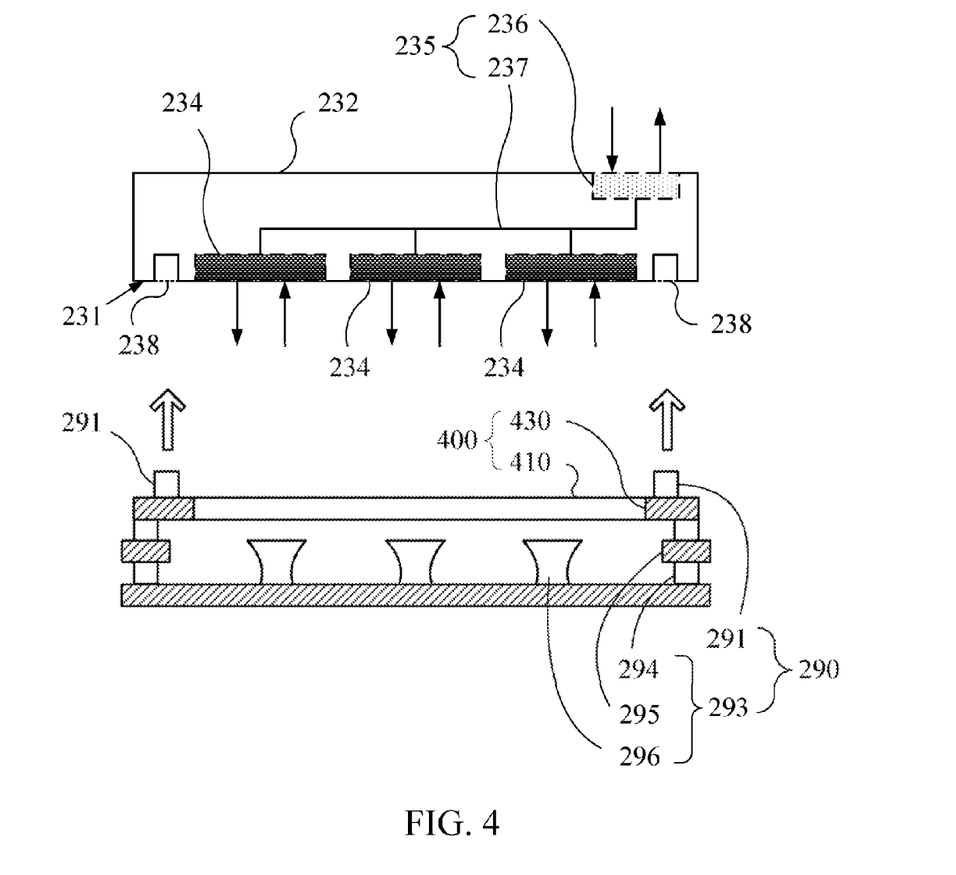
FIG. 4 is a schematic side view of the processing platform and the workpiece according to the first embodiment.

FIG. 3A is a schematic bottom view of the processing platform 230 according to the first embodiment. FIG. 3B is a schematic bottom view of the workpiece 400 according to the first embodiment. FIG. 4 is a schematic side view of the processing platform 230 and the workpiece 400 according to the first embodiment. Referring to FIG. 3A, FIG. 3B, and FIG. 4, the processing platform 230 includes a substrate 232 and an airflow system 235.

As shown in FIG. 3A, the substrate 232 may be made of a porous material to form a plurality of pore portions 234 by, for example, sintering capillary fibers, ceramics, or metal powder. Alternatively, the substrate 232 may also be made of quartz glass or other optical glass or crystals, to diffuse the laser beam 500, thereby preventing the laser beam 500 from being reflected by the substrate 232 to cause damages to the workpiece 400.

In some embodiments, to prevent dust from being adsorbed to the workpiece 400 due to static electricity of the substrate 232, the substrate 232 is made of a conductive material, and is grounded.

As shown in FIG. 4, the airflow system 235 is connected to the substrate 232. The airflow system 235 may include a positive-negative pressure supplying unit 236 and an air chamber 237. The air chamber 237 is connected between each of the pore portions 234 and the positive-negative pressure supplying unit 236. Thereby, the airflow system 235 may generate a positive pressure airflow on a surface (the adsorption surface 231), of the substrate 232, to lift the workpiece 400. Alternatively, the airflow system 235 may generate a negative pressure airflow on the surface of the substrate 232, to adsorb the workpiece 400. In some embodiments, the airflow system 235 generates the positive pressure or negative pressure airflow through switching of an electromagnetic valve.

Please refer to FIG. 3B, in which the workpiece 400 includes a processing area 410 and an invalid area 430 on the periphery of the processing area 410. The processing area 410 is planned as an area with laser processing. The invalid area 430 is planned as an area without laser processing, by means of which a plurality of locating points 450 may be disposed in the invalid area 430. Furthermore, as shown in FIG. 3A, the substrate 232 may be opened with locating holes 238 corresponding to the locating points 450, so as to achieve a location effect together with the material delivery system 290.

The material delivery system 290 may place the workpiece 400 on the processing platform 230 in a locating manner (for example, by using a locating pin or using a mechanical manipulator with visual location). The locating pin is taken as an example for illustration below, and as shown in FIG. 4, the material delivery system 290 includes clamping members (or suction cups), 291.

The clamping members 291 clamp or suck the workpiece 400 at the locating points (not shown), of the workpiece 400, and are fitted loosely in the corresponding locating holes 238. The airflow system 235 then adsorbs the workpiece 400, so as to fix the workpiece 400 on the substrate 232.

As shown in FIG. 4, in some embodiments, the material delivery system 290 further includes an air-lift delivery module 293. The air-lift delivery module 293 includes a contact holding member 294, a tension stretching platform 295, and an air-lift nozzle 296.

The contact holding member 294 may substantially include a nozzle or a fixing gate, and used for holding the workpiece 400. The tension stretching platform 295 is connected to the contact holding member 294, and moves horizontally to exert a horizontal pulling force or tension on the workpiece 400. The air-lift nozzle 296 is used for generating a positive pressure airflow, to avoid collision damage of the workpiece 400 when the workpiece 400 is delivered to the processing platform 230.

The laser processing machine 200 may further include an ion gun (not shown), for eliminating the static electricity on the workpiece 400 after the workpiece 400 is located. Dust is therefore prevented from being adsorbed to the surface of the workpiece 400 during processing.

Please refer again to FIG. 2. In some embodiments, the cavity 210 includes an external cavity 211 and a closed cavity 213. The external cavity 211 is used for wrapping the closed cavity 213. In some embodiments, the external cavity 211 is preferably made of a granite material, so as to provide stable and reliable peripheral protection.

Figure 5:
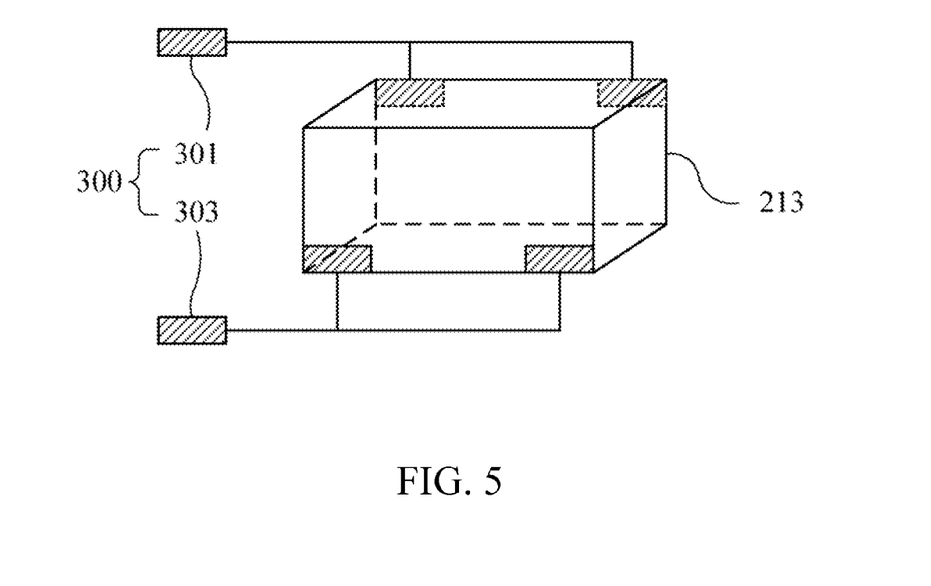
FIG. 5 is a schematic view of a temperature-humidity control system according to the first embodiment.

FIG. 5 is a schematic view of a temperature-humidity control system 300 according to the first embodiment. As shown in FIG. 5, the laser processing machine 200 may further include the temperature-humidity control system 300, for maintaining constant temperature and humidity in the closed cavity 213. The temperature-humidity control system 300 includes an air blow-in device 301 and an air exhaust device 303. The air blow-in device 301 is used for blowing air of constant temperature into the closed cavity 213. The air exhaust device 303 is used for exhausting the air inside the closed cavity 213, so as to maintain a low vacuum state inside the closed cavity 213. The air blow-in device 301 may be disposed at an upper part inside the closed cavity 213, and the air exhaust device 303 is disposed at a lower part inside the closed cavity 213. In this manner, the dust falling under the influence of gravity can be brought away from the closed cavity 213.

In addition, the temperature-humidity control system 300 may also perform constant temperature control through a water circulation system, and maintain constant humidity in the closed cavity 213 through a dehumidifier.

Figure 6:
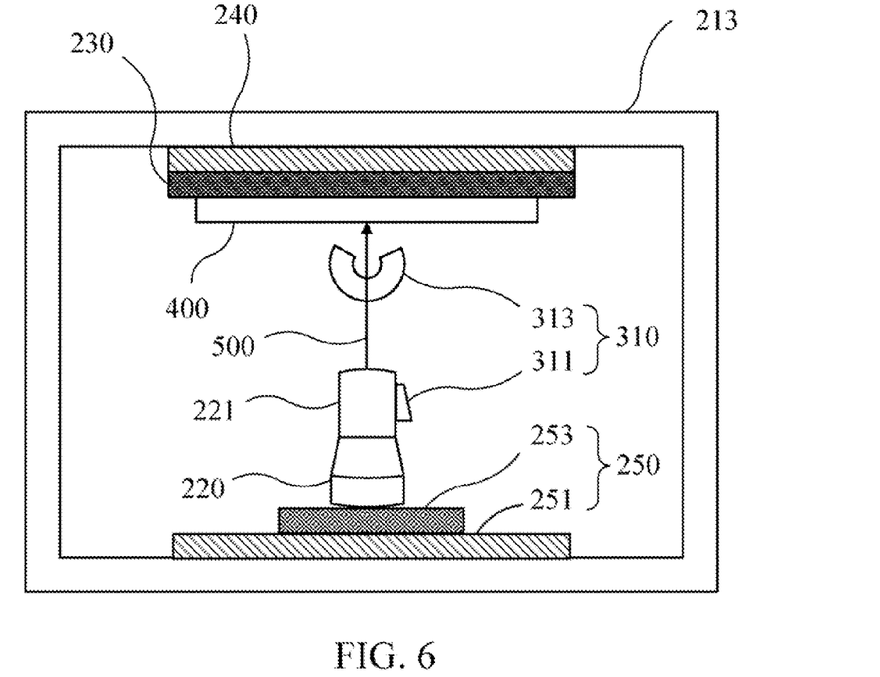
FIG. 6 is a schematic view of a dust collection system according to the first embodiment.

FIG. 6 is a schematic view of a dust collection system 310 according to the first embodiment. As shown in FIG. 6, the laser processing machine 200 may further include the dust collection system 310. The dust collection system 310 includes an air-blowing nozzle 311 and an air-suction mask 313.

The air-blowing nozzle 311 may be disposed on a laser head 221 of the laser system 220. The air-suction mask 313 is disposed between the processing platform 230 and the laser system 220 with a concave surface facing upwards. The air-blowing nozzle 311 is used for centrally blowing air to the surface of the workpiece 400 with the laser beam 500. The air-suction mask 313 is used for sucking the dust blown by the air-blowing nozzle 311. Those of ordinary skill in the art should understand that the dust collection system 310 still includes a positive pressure supplying unit provided for the air blowing operation of the air-blowing nozzle 311 and a pipeline connected therebetween, and a negative pressure supplying unit provided for the air suction operation of the air-suction mask 313 and a pipeline connected therebetween.

Figure 7:
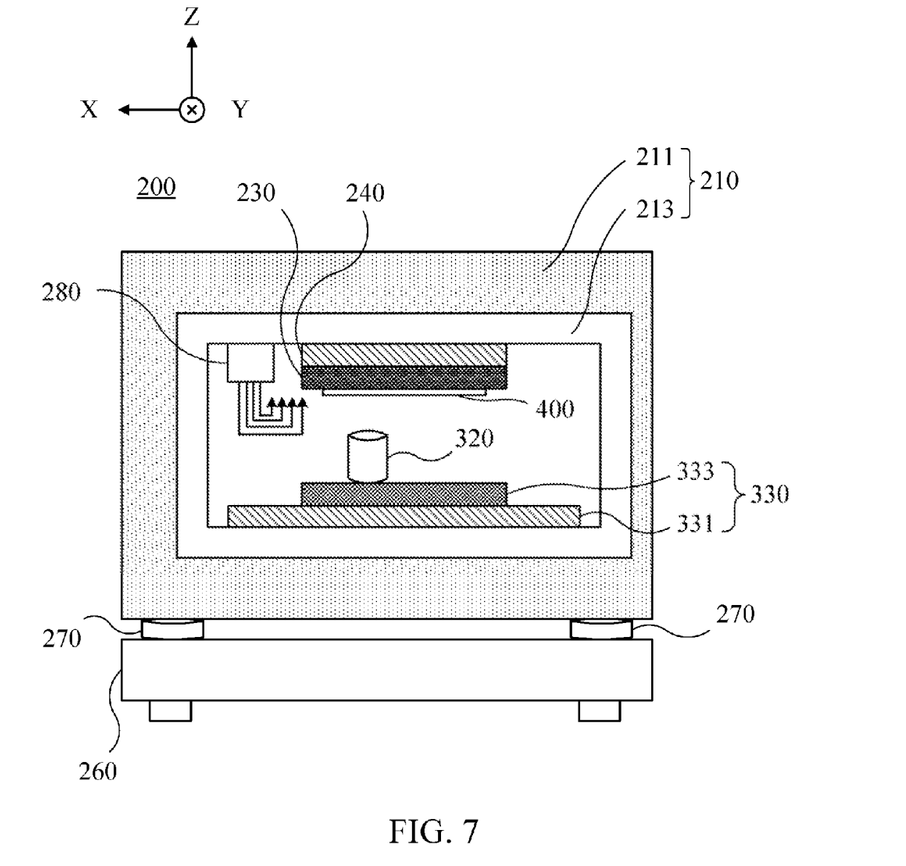
FIG. 7 is a schematic front view of a laser processing machine according to a second embodiment.

In a second embodiment of the disclosure, FIG. 2 is a schematic back view of the laser processing machine 200 according to the second embodiment. FIG. 7 is a schematic front view of the laser processing machine 200 according to the second embodiment.

Please refer to FIG. 7, in which this embodiment is substantially the same as the first embodiment, in which the laser processing machine 200 further includes an optical detection system 320 and a second lower motion platform 330. The optical detection system 320 and the second lower motion platform 330 are disposed at the lower part inside the cavity 210.

The optical detection system 320 is used for locating the workpiece 400, and then the laser system 220 performs laser processing on the workpiece 400. Alternatively, after the laser processing, the laser system 220 may modify laser parameters and repair the workpiece 400 according to a detection result of the optical detection system 320. The optical detection system 320 may include image capturing lenses and an interferometer.

The image capturing lens is used for capturing an image of the workpiece 400, to facilitate location of the workpiece 400, the position of which conforms to coordinates of the upper motion platform 240 and the second lower motion platform 330. Furthermore, the optical detection system 320 may recognize the image of the workpiece 400 through an image processing technology, so as to facilitate laser processing and repair after the processing. For example, the workpiece 400 may be deformed when clamped or heated in the processing, or the actual locating points offset with respect to wirings due to precision errors in a printed wiring process before the laser processing. In this case, the optical detection system 320 may compare originally predetermined graphics with actual graphics to obtain corrected new graphics, and plan a predetermined laser scribing line path, so as to obtain coordinates of a path that really demands the laser processing. The coordinates of the processing path may be used by the laser system 220 to process or repair the workpiece 400.

Furthermore, the visual perception of human eyes may be simulated through visual cross-points of the two image capturing lenses, so as to correct the height of the Z-axis motion platform.

The interferometer may be a white-light interferometer or a laser interferometer, and used for obtaining surface profiles of the workpiece 400. Furthermore, according to parameters obtained from the surface profiles (for example, removal line width, and height and width of protruding round hillocks), a grey correlation method or Taguchi method may be adopted to acquire optimal setting of the laser parameters, so as to correct the laser parameters.

The second lower motion platform 330 is used for loading and driving the optical detection system 320 to move. In some embodiments, the second lower motion platform 330 includes an X-axis motion platform 331 and a Z-axis motion platform 333. The X-axis motion platform 331 enables the optical detection system 320 to move along an X-axis direction. The Z-axis motion platform 333 enables the optical detection system 320 to move along a Z-axis direction. Thereby, the optical detection system 320 is enabled to move to an appropriate position, to detect the workpiece 400.

Figure 8:
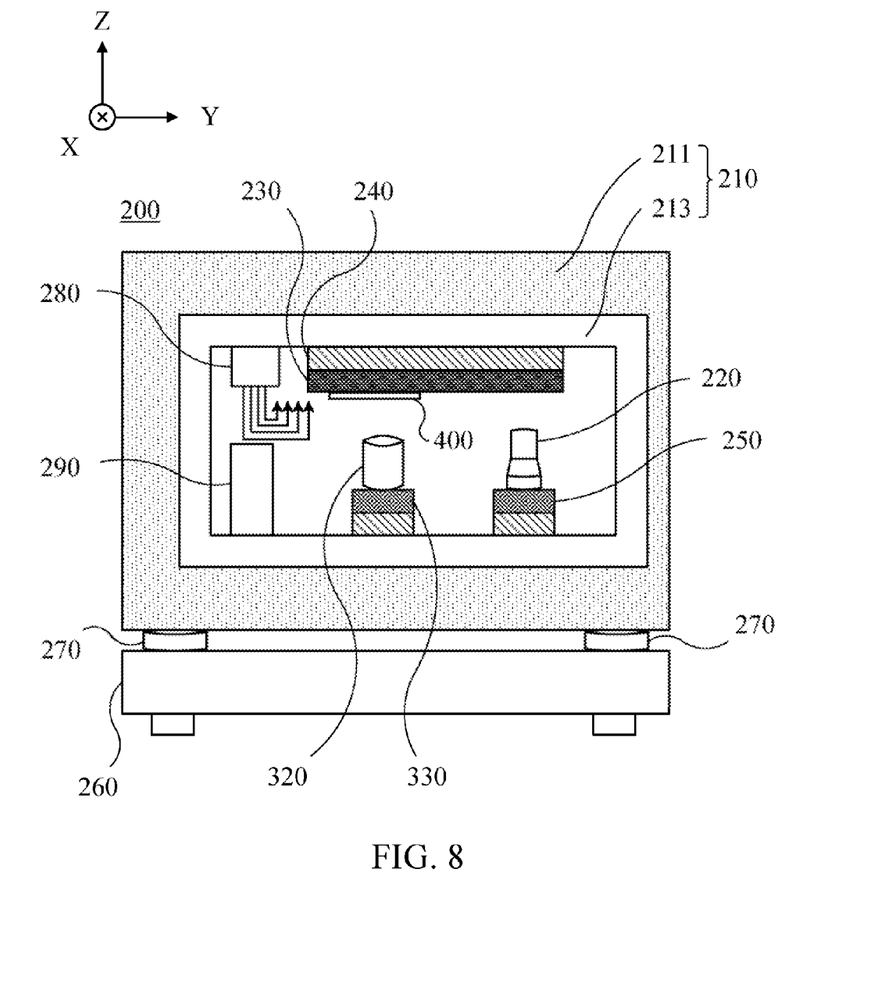
FIG. 8 is a schematic side view of the laser processing machine according to the second embodiment.
Figure 9:
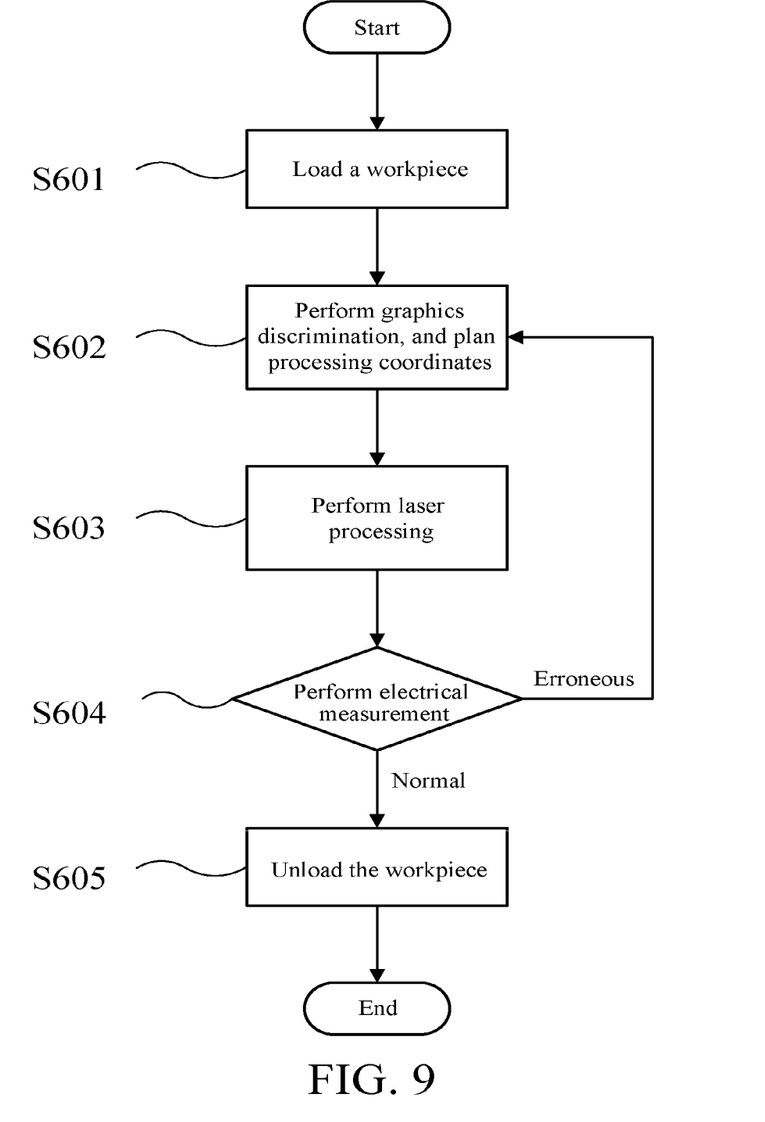
FIG. 9 is an operation flow chart of the laser processing machine according to the second embodiment.

FIG. 8 is a schematic side view of the laser processing machine 200 according to the second embodiment. FIG. 9 is an operation flow chart of the laser processing machine 200 according to the second embodiment.

Please refer to FIG. 8. In some embodiments, the electrical measurement system 280 and the material delivery system 290 is located at a front section of the laser processing machine 200, the optical detection system 320 is located at a middle section of the laser processing machine 200, and the laser system 220 is located at a rear section of the laser processing machine 200.

Please refer to FIG. 9. In some embodiments, the workpiece 400 is loaded onto the processing platform 230 at the front section of the laser processing machine 200, and is deionized (Step S601). Next, the optical detection system 320 at the middle section performs graphics discrimination to locate the workpiece 400, and plans a predetermined laser processing path and coordinates thereof (Step S602). Afterwards, the laser system 220 at the rear section processes the workpiece 400 (Step S603).

After the processing is completed, the electrical measurement system 280 at the front section of the laser processing machine 200 performs electrical measurement on the workpiece 400 (Step S604). If wiring failure is detected, the process returns to Step S602, and graphics discrimination is performed to generate a new laser processing path and coordinates thereof, so that the workpiece 400 is repaired in Step S603. If no wiring failure is detected, the workpiece 400 is unloaded after being deionized at the front section of the laser processing machine 200 (Step S605).

Figure 10:
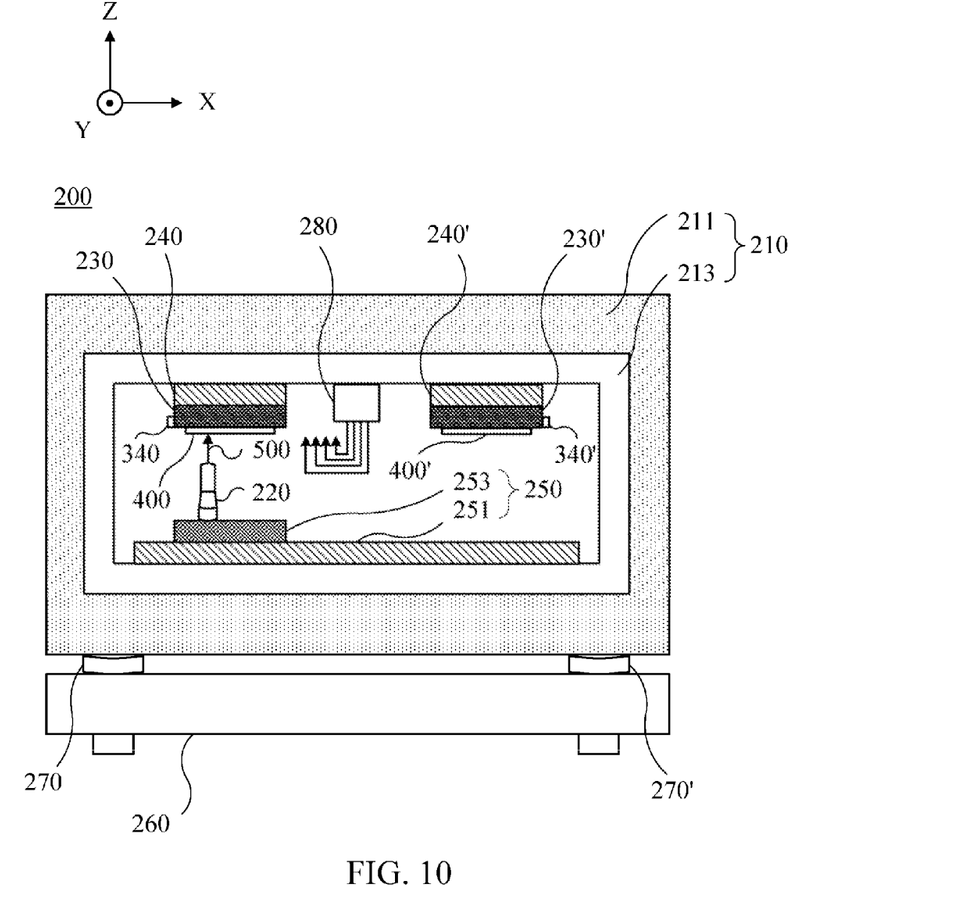
FIG. 10 is a schematic back view of a laser processing machine according to a third embodiment.
Figure 11:
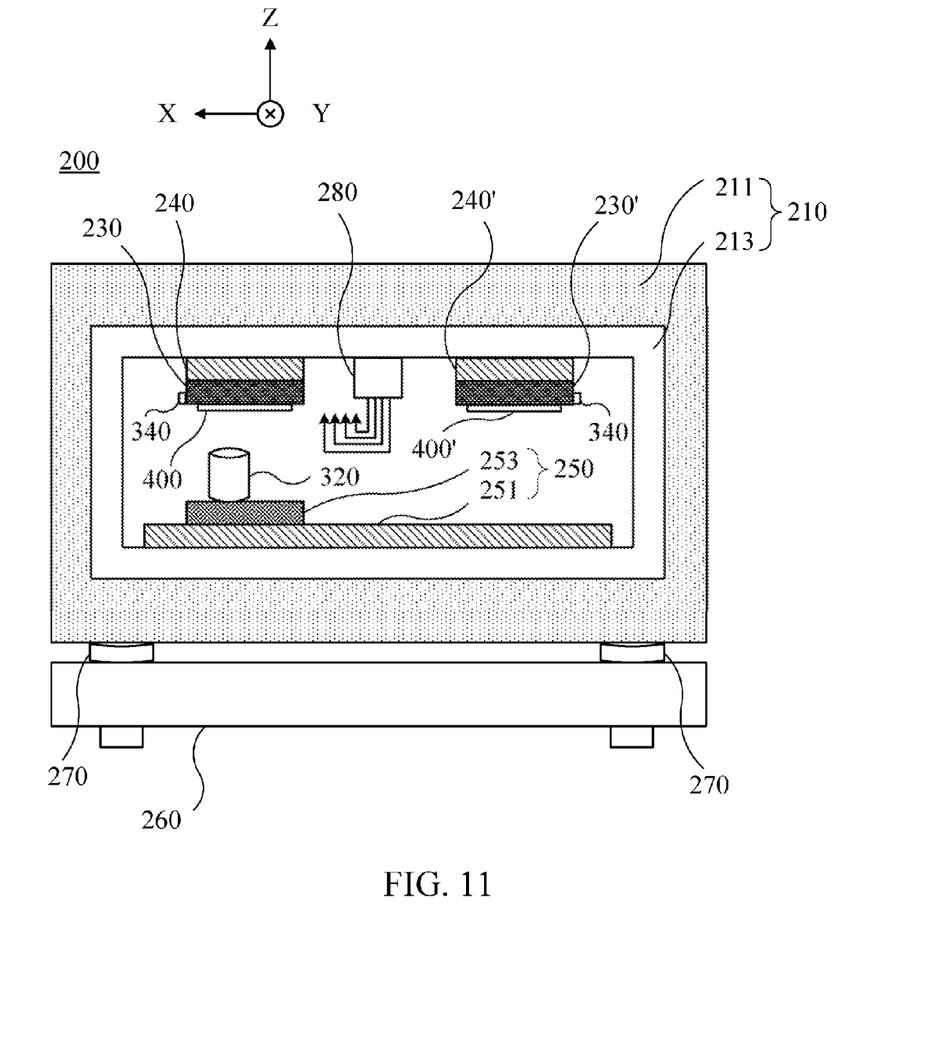
FIG. 11 is a schematic front view of the laser processing machine according to the third embodiment.

FIG. 10 is a schematic back view of the laser processing machine 200 according to a third embodiment. FIG. 11 is a schematic front view of the laser processing machine 200 according to the third embodiment.

Please refer to FIG. 10 and FIG. 11, in which the third embodiment is substantially the same as the second embodiment, in which the laser processing machine 200 includes two processing platforms 230 and 230' and two upper motion platforms 240 and 240'. The processing platforms 230 and 230' are respectively disposed at two sides of the cavity 210. The upper motion platforms 240 and 240' are also respectively disposed at the two sides of the cavity 210 corresponding to the processing platforms 230 and 230'.

The laser system 200 processes the workpiece 400 or 400' on one of the two processing platforms 230 and 230', and the optical detection system 320 detects the workpiece 400 or 400' on the other processing platform 230 or 230'. For example, the laser system 200 moves to a position below the processing platform 230' after processing the workpiece 400 on the processing platform 230, and then processes the workpiece 400'. At this time, the optical detection system 320 performs optical graphics discrimination and location or processing result detection on the workpiece 400, to obtain an actual laser processing path or processing coordinates to be repaired. After processing the workpiece 400', the laser system 200 returns to further process or to repair the workpiece 400. At this time, the optical detection system 320 may perform optical graphics discrimination or processing result detection on the workpiece 400' at the same time. In this way processing and detection can be performed at the same time, and the processing time is reduced. In addition, as the processing and detection are both performed on the same machine, the workpieces 400 and 400' are continuously located on the processing platforms 230 and 230'. This saves the relocation time of the workpieces 400 and 400' when loaded and unloaded.

Please refer to FIG. 10. In some embodiments, the laser processing machine 200 further includes accelerometers 340 and 340' and damping systems 270 and 270'. The accelerometers 340 and 340' may be disposed on the processing platforms 230 and 230' or disposed on the upper motion platforms 240 and 240', and used for sensing motion changes of the processing platforms 230 and 230'. The damping systems 270 and 270' are respectively disposed at a lower part outside the cavity 210 corresponding to the processing platforms 230 and 230'. Each damping system may include a plurality of dampers, and preferably includes two dampers, which are disposed one after the other at the lower part outside the cavity 210. Damping coefficients of the dampers in the damping system 270 change according to the sensing data of the accelerometer 340. That is, when the upper motion platform 240 is in accelerated motion, the vibration caused thereby may affect the upper motion platform 240'. The damping system 270 therefore raises the damping coefficients in real time to resist the vibration caused by the upper motion platform 240. After the vibration impact disappears, the damping system 270 further decreases the damping coefficients to the original values. In this manner, the motions of the two processing platforms 230 and 230' are prevented from influencing each other. In addition, the damping systems 270 and 270' may also prevent ground vibration from affecting the process.

In some embodiments, to reduce the mutual influence between the two processing platforms 230 and 230', the two processing platforms 230 and 230' respectively move at a relatively high speed and a relatively low speed.

In view of these facts, through the embodiments of the disclosure, dust is effectively removed by gravity so as to avoid wiring failure. Processing and detection can be performed at the same time on one machine, effectively reducing the processing time. Consequently, the disclosure can improve the industrial production capacity and yield.

While the disclosure has been described by the way of example and in terms of the preferred embodiments, it is to be understood that the disclosure need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A laser processing machine, comprising:
    a cavity;
    a laser system, disposed at a lower part inside the cavity, and used for outputting a laser beam, wherein a traveling direction of the laser beam is opposite to the gravity direction;
    at least one processing platform, disposed at an upper part inside the cavity, and comprising an adsorption surface and a connection surface facing each other, wherein the adsorption surface is located below the connection surface, and is used for adsorbing a workpiece; and
    at least one upper motion platform, disposed at the upper part inside the cavity, and correspondingly connected to the connection surface of the at least one processing platform, for driving the at least one processing platform to move.

2. The laser processing machine according to claim 1, wherein the processing platform comprises:
    a substrate, made of a porous material; and
    an airflow system, connected to the substrate, and used for generating a positive pressure airflow on a surface of the substrate, to lift the workpiece, or generating a negative pressure airflow on the surface of the substrate, to adsorb the workpiece.

3. The laser processing machine according to claim 1, wherein the substrate is made of a conductive material, and is grounded.

4. The laser processing machine according to claim 1, further comprising:
    an air-blowing nozzle, disposed on the laser system, and used for blowing air to a surface of the workpiece with the laser beam; and
    an air-suction mask, disposed between the processing platform and the laser system with a concave surface facing upwards, and used for sucking dust blown by the air-blowing nozzle.

5. The laser processing machine according to claim 1, further comprising:
    a first lower motion platform, disposed at the lower part inside the cavity, and used for loading and driving the laser system to move.

6. The laser processing machine according to claim 1, further comprising:
    an optical detection system, disposed at the lower part inside the cavity, and used for detecting the workpiece, so that the laser system is enabled to modify laser parameters and repair the workpiece according to a detection result; and a second lower motion platform, disposed at the lower part inside the cavity, and used for loading and driving the optical detection system to move.

7. The laser processing machine according to claim 6, wherein the number of the at least one processing platform is two, and the two processing platforms are respectively disposed at two sides of the cavity, the laser system processes the workpiece loaded on one of the two processing platforms, and the optical detection system detects the workpiece loaded on the other processing platform.

8. The laser processing machine according to claim 7, further comprising:

two accelerometers, for respectively sensing motion changes of the two processing platforms; and two damping systems, disposed at a lower part outside the cavity corresponding to the two processing platforms, wherein damping coefficients of the two damping systems change with sensing data of the two accelerometers.

9. The laser processing machine according to claim 7, wherein the two processing platforms respectively move at a relatively high speed and a relatively low speed.

10. The laser processing machine according to claim 1, further comprising:

an electrical measurement system, for measuring impedance of a wire scribed on the workpiece by the laser system, so that the laser system is enabled to repair the workpiece.

11. The laser processing machine according to claim 1, further comprising:

a temperature-humidity control system, for maintaining constant temperature and humidity inside the cavity.

* * * * *